(12) United States Patent
Cloin et al.

(10) Patent No.: US 10,019,702 B2
(45) Date of Patent: Jul. 10, 2018

(54) TECHNIQUES FOR RETAIL PRINTING

(71) Applicants: James Asa Cloin, Arlington, TX (US); James Lee Fortuna, Dallas, TX (US)

(72) Inventors: James Asa Cloin, Arlington, TX (US); James Lee Fortuna, Dallas, TX (US)

(73) Assignee: NCR Corporation, Atlanta, GA (US)

( * ) Notice: Subject to any disclaimer, the term of this patent is extended or adjusted under 35 U.S.C. 154(b) by 70 days.

(21) Appl. No.: 13/656,780

(22) Filed: Oct. 22, 2012

(65) Prior Publication Data

US 2014/0114782 A1   Apr. 24, 2014

(51) Int. Cl.
| | |
|---|---|
| G06K 15/02 | (2006.01) |
| G06Q 20/20 | (2012.01) |
| G06Q 20/32 | (2012.01) |
| G07F 17/42 | (2006.01) |
| G07G 1/00 | (2006.01) |
| G06F 3/12 | (2006.01) |

(52) U.S. Cl.
CPC ........... *G06Q 20/32* (2013.01); *G06F 3/1204* (2013.01); *G06F 3/126* (2013.01); *G06F 3/1292* (2013.01); *G07F 17/42* (2013.01); *G07G 1/0009* (2013.01)

(58) Field of Classification Search
CPC ....... G07F 17/42; G06Q 20/32; G06F 3/1204; G06F 3/126; G06F 3/1292; G07G 1/0009
See application file for complete search history.

(56) References Cited

U.S. PATENT DOCUMENTS

| | | | | |
|---|---|---|---|---|
| 6,952,831 | B1* | 10/2005 | Moore | 719/327 |
| 7,999,951 | B2* | 8/2011 | Ferlitsch | 358/1.13 |
| 8,508,757 | B1* | 8/2013 | Koehl | G06F 19/326 |
| | | | | 358/1.13 |
| 2001/0029531 | A1* | 10/2001 | Ohta | 709/223 |
| 2002/0138564 | A1* | 9/2002 | Treptow et al. | 709/203 |
| 2004/0143549 | A1* | 7/2004 | Likourezos | G06Q 30/04 |
| | | | | 705/40 |
| 2005/0012951 | A1* | 1/2005 | Madril, Jr. | G06F 3/1204 |
| | | | | 358/1.13 |
| 2005/0052700 | A1* | 3/2005 | Mackenzie | G06F 3/03545 |
| | | | | 358/1.18 |
| 2005/0146742 | A1* | 7/2005 | Gregory | 358/1.15 |
| 2006/0012828 | A1* | 1/2006 | Ohta | 358/1.18 |
| 2006/0028674 | A1* | 2/2006 | Lapstun et al. | 358/1.15 |
| 2006/0028681 | A1* | 2/2006 | Aagesen | G06F 3/1206 |
| | | | | 358/1.15 |
| 2007/0022174 | A1* | 1/2007 | Issa | H04L 67/104 |
| | | | | 709/217 |
| 2007/0290038 | A1* | 12/2007 | Woodcock et al. | 235/383 |
| 2008/0158581 | A1* | 7/2008 | Ferlitsch | 358/1.13 |
| 2008/0252910 | A1* | 10/2008 | Cordesses | H04L 29/12113 |
| | | | | 358/1.1 |
| 2009/0167553 | A1* | 7/2009 | Hong | G06Q 10/02 |
| | | | | 340/4.61 |

(Continued)

*Primary Examiner* — Mussa A Shaawat
(74) *Attorney, Agent, or Firm* — Schwegman, Lundberg & Woessner

(57) ABSTRACT

Techniques for retail printing are provided. A handheld device is placed within a configured proximity to a printer and acquires a printer identifier for that printer. The handheld device transmits the identifier and print data opened on the handheld to a printer server service. The printer server service maps the identifier to the printer and forwards the print data to the printer for printing on behalf of the handheld device.

18 Claims, 3 Drawing Sheets

(56) References Cited

U.S. PATENT DOCUMENTS

2012/0324124 A1* 12/2012 Locker .............. H04W 72/0486
709/233
2013/0297401 A1* 11/2013 Yu .............................. 705/14.38

* cited by examiner

TECHNIQUES FOR RETAIL PRINTING

BACKGROUND

Automation for goods and services has reached record levels in society. Examples are everywhere from online banking and purchasing to a wide-range of devices and physical appliances that include computing and networking capabilities, which were just wishful dreams only a decade ago. For the most part, these advances have occurred because of breakthroughs in electronics and wireless communications, which have allowed complex processing and network connectivity to be achieved in the smallest of physical devices, such as a smart phone or other handheld computing devices, for relatively small cost and effort.

One business process that has not advanced to any significant degree is onsite guest service in the restaurant/entertainment industry. True, consumers can pre-order online, make reservations online, view menus online, and the like; but, the onsite physical experience associated with the meal has not advanced to any significant degree. The most significant advancement appears to be the use of portable handheld devices to take orders from customers at entertainment/sporting events or within a restaurant.

One area that has experienced almost no automation is that associated with printing customer receipts and/or checks at restaurants. Printing a restaurant guest check from a handheld wireless computer is often difficult for a variety of reasons, one of them being that the association between a specific handheld and a specific printer is problematic. Existing solutions generally require that a mobile printer, used in tandem with a given handheld, is "paired" with that handheld by the end-user; that a fixed-position printer is logically assigned to a handheld as a matter of administrator system configuration; or that an end-user manually selects a printer for each print job using software running on the handheld computer. None of these approaches are ideal. Mobile printers are expensive to buy and maintain; they are bulky for wait staff to carry; they can take away from restaurant ambiance; and the process of "pairing" them to specific handhelds can be cumbersome and error prone. Logically assigning particular handhelds to specific fixed-position printers can be difficult to administer and is often insufficiently flexible.

Moreover, logically assigning each specific print job to a particular printer negatively impacts speed-of-service and is frustrating for end users and customers they serve.

Of course, if a handheld has its own printing device, then printing may not be much of an issue, such as a car rental check-in facility. However, poor ergonomics and other often insurmountable issues are present as such devices are bulky, expensive, and difficult to maintain with ink and paper. Most restaurants are not apt to change over to these devices when margins for the business are low to begin with. Furthermore, tasking a waiter with changing ink and paper in these devices during a rush time may in and of itself make using such devices impractical for the restaurant industry.

SUMMARY

In various embodiments, techniques for retail printing are presented. According to an embodiment, a method for retail printing is provided.

Specifically, a unique identifier is acquired for a printer of a retail establishment. The unique identifier is then acquired by a handheld device that is within close proximity to the printer. Next, the unique identifier and print data opened on the handheld device are communicated to a server service. The server service forwards the print data to the printer for immediate printing.

DETAILED DESCRIPTION

Figure 1:
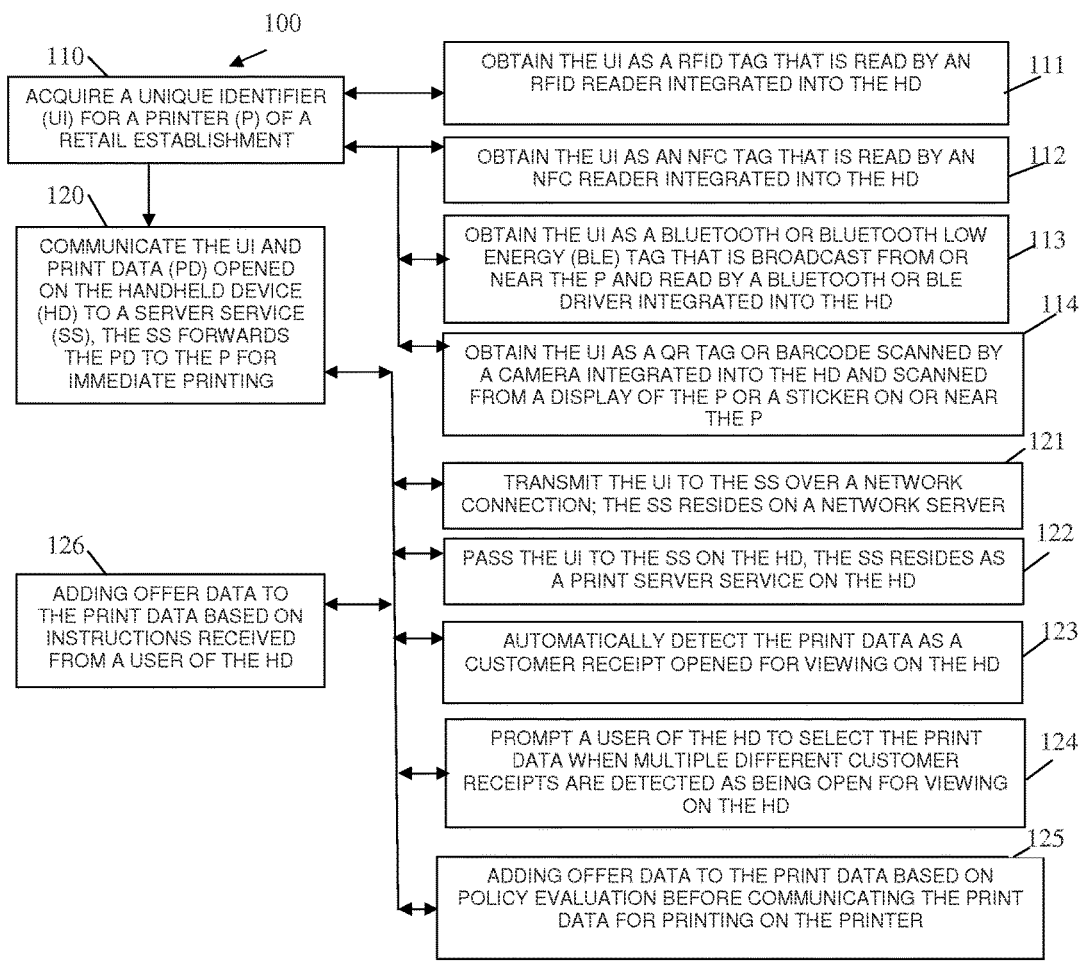
FIG. 1 is a diagram of a method for retail printing, according to an example embodiment.

FIG. 1 is a diagram of a method 100 for retail printing, according to an example embodiment. The method 100 (hereinafter "handheld print manager") is implemented as instructions programmed and residing on a non-transitory computer-readable (processor-readable) storage medium and executed by one or more processors. The processors are specifically configured and programmed to process the handheld print manager. The handheld print manager operates over a network. The network is wired, wireless, or a combination of wired and wireless.

In an embodiment, the handheld print manager processes on processors of a handheld computing device. As used herein a "handheld computing device," includes a portable device that communicates with a network wirelessly, such as but not limited to, a tablet, a smart phone, a customized retail computing device, and the like.

Additionally, the term "tag" can include any format associated with Near Field Communication (NFC), Bluetooth, Bluetooth Low Energy (BLE), Radio Frequency (RF), Quick Response (QR) codes, barcodes, or combinations of these formats. The tag is also embodied within a computer-readable medium as a data structure, data glyph, image, and/or string of characters (alphanumeric, numeric, symbols, punctuation, printable, and/or unprintable).

As will become more apparent herein and below, the techniques herein solve the above-stated retail printing problems by making it possible to print a document (e.g., transaction receipt and the like) on a handheld computing device (may be referred to herein and below as"a handheld" or "a handheld device") by simply tapping or nearly tapping a printer with the handheld (by being within a predefined geographic proximity to the printer or a sub device of the printer (discussed below)), thereby, enabling a waiter/retailer to immediately make use of any nearby printer with a single action that is quick and intuitive.

Further, it will become apparent from the teachings herein that the techniques presented simplify and accelerate the process of retail printing for any document (receipt or data) on a handheld without the many expenses and complexity drawbacks associated with having a dedicated printer for each handheld. The approach can also make use of existing printer hardware, which can already be present in the restaurant or retail establishment; thereby, eliminating the need to purchase new printers in order to gain the advantages of the teachings presented herein.

Specifically and in an embodiment, a Radio Frequency Identifier (RFID) tag, a Near Field Communication (NFC) tag, a Bluetooth tag, and/or a Bluetooth Low Energy (BLE) tag is first physically associated with or assigned to a printer. That physical association may be established by affixing the tag to the exterior of the printer; embedding the tag inside the printer; or affixing the tag to a surface or an object near the printer. The tag may optionally be visible to the retail staff, and if visible may optionally display a human readable number, text, or symbol. In any case, after the physical association between the tag and the printer is made, a logical association is further made in software, preferably using a handheld computer in a simple, one-time setup process. This logical association ties the human readable printer "name" configured in the system to the machine readable tag value of the tag that was physically associated with the printer. Optionally, if the tag is embedded in the printer during the manufacturing process, the printer's firmware may include the unique tag value, permitting the printer to advertise that value to any system using it for print jobs. This feature may eliminate any system configuration related to handheld printing, including the onetime logical assignment of the printer's tag value to a specific printer name or label. In any case, once the logical association has been completed through either the one time manual setup process or the advertisement of the tag value on the printer's local area network (LAN), the waiter (retail staff) can tap, scan, or receive a broadcasted tag associated with the printer to automatically print any document currently open on the waiter's handheld device.

At 110, the handheld print manager acquires a unique identifier for a printer of a retail establishment. The unique identifier may be electronically transmitted to the handheld device or can be scanned by the handheld device (when a QR or barcode tag is implemented). The retail establishment can include an entertainment facility, a restaurant, and the like. It is noted that the retail establishment can include a plurality of printers located throughout the retail establishment. The manner in which the unique identifier is acquired can occur in a variety of manners.

For example, at 111, the handheld print manager obtains the unique identifier as an RFID tag that is read by an RFID reader integrated into the handheld device.

In another case, at 112, the handheld print manager obtains the unique identifier as an NFC tag that is read by an NFC reader integrated into the handheld device.

According to another situation, at 113, the handheld print manager obtains the unique identifier as a Bluetooth or BLE tag that is broadcast from or near the printer and read by a Bluetooth or BLE driver integrated into the handheld device.

In still another case, at 114, the handheld print manager obtains the unique identifier as a OR tag or barcode tag that is canned by a camera that is integrated into the handheld device and scanned from either a display of the printer or a sticker on or near the printer.

At 120, the handheld print manager communicates the unique identifier and print data opened on the handheld device for viewing to a server service. The server service forwards the print data to the printer for immediate printing. It is the server service that resolves a maintained mapping between the unique identifier and the printer. Processing associated with the server service is presented below with reference to the FIG. 2.

According to an embodiment, at 121, the handheld print manager transmits the unique identifier along with commands ordering the print job for the print data to the server service over a network connection where the server service resides on a network server.

Alternatively, at 122, the handheld print manager passes the unique identifier to the server service on the handheld device (the same handheld device that processes the handheld print manager). So, this is intra-device communication. Here, the server service resides as a print server on the handheld device. Communication between the server service and the printer to print the print data then becomes a Peer-to-Peer (P2P) communication between the handheld device and the printer.

In an embodiment, at 123, the handheld print manager automatically detects the print data as a customer receipt opened for viewing on the handheld device.

In some situations, at 124, the handheld print manager prompts a user of the handheld device to select the print data from a variety of available print data when multiple different customer receipts are detected as being opened for viewing on the handheld device.

In yet another case, at 125, the handheld print manager adds offer data to the print data based on policy evaluation before communicating the print data for printing on the printer. This can include local attractions, enterprise specific coupons, and others.

In some circumstances, at 126, the handheld print manager adds offer data to the print data based on instructions received from the user (waiter) of the handheld device.

The server service may also inject its own offer data to the print data independent of the handheld device based on enterprise policy evaluation.

In an embodiment, the retail establishment is a restaurant and the handheld device is a smart phone or tablet operated by a waiter. The waiter taps or gets near (which a configured proximity distance) to a printer and the waiter's handheld device acquires a printer identifier, which is then automatically sent to a server service along with print data that is currently opened as a receipt for a customer on the handheld device. The server service uses the printer identifier to locate the printer that the waiter is near and sends the print data to that printer for immediate printing.

One readily recognizes the efficiencies and benefits of such a situation—how often are customers waiting for receipts because there are backups at one terminal that can print within a restaurant. This approach gives complete freedom of movement to the waiter and creates efficiencies not heretofore capable of being achieved. It is noted that a variety of other specific implementations can beneficially use the teachings presented herein.

As discussed above, the server service can reside on a remote network server, on the handheld device, or in some instances on a Point-Of-Sale (POS) terminal that is directly connected to the printer and includes a printer driver for the printer that is being shared.

Figure 2:
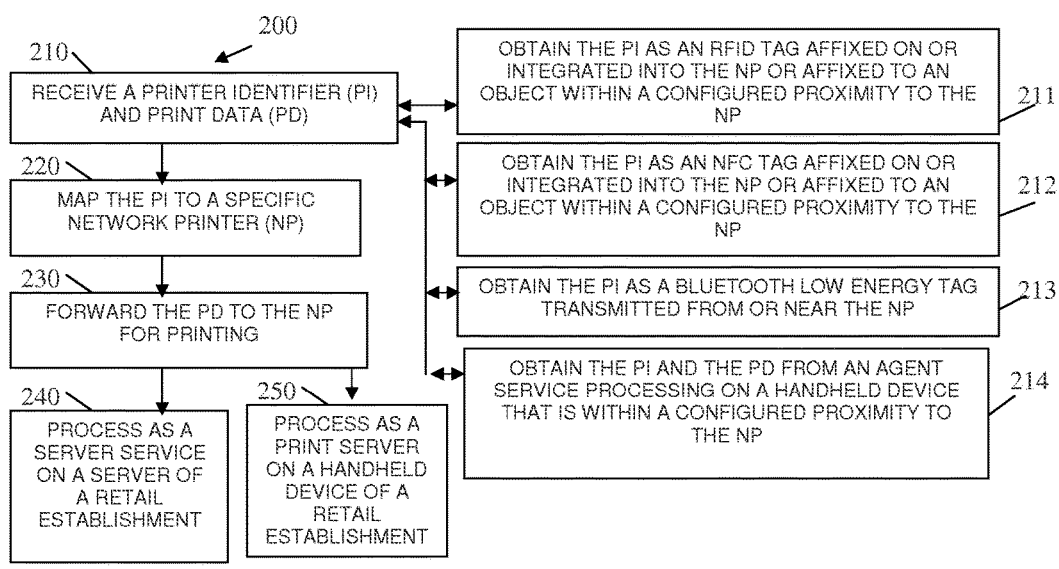
FIG. 2 is a diagram of another method for retail printing, according to an example embodiment.

FIG. 2 is a diagram of another method 200 for retail printing, according to an example embodiment. The method 200 (hereinafter "printer connection controller") is implemented as instruction and programmed within a non-transitory computer-readable (processor-readable) storage medium that executes on one or more processors of a processing device; the processors of the device are specifically configured to execute the printer connection controller. The printer connection controller is operational over a network; the network is wired, wireless, or a combination of wired and wireless.

Whereas the handheld print manager (the FIG. 1 above) describes processing from the perspective of a handheld computing device, the printer connection controller describes processing from the perspective of the server service of a retail establishment (which can execute on the handheld device, on a network server, or on a POS terminal). The handheld printer manager and the printer connection controller communicate and interact with one another as discussed above with respect to the FIG. 1 and as discussed below with respect to the FIG. 2.

At 210, the printer connection controller receives a printer identifier for a specific network printer and print data (that is currently opened and being viewed on a handheld device such as the handheld device discussed above with reference to the FIG. 1. The printer identifier and the print data that is to be printed on the specific network printer (identified by the printer identifier) are received from a handheld device that is touching or that is within a configured proximity distance to the specific network printer.

According to an embodiment, at 211, the printer connection controller obtains the printer identifier as an RFID tag affixed on or integrated into the specific network printer or affixed on an object within a configured proximity distance of the specific network printer.

In a similar case, at 212, the printer connection controller obtains the printer identifier as an NFC tag affixed on or integrated into the specific network printer or affixed on an object within the configured proximity distance of the specific network printer.

In yet another situation, at 213, the printer connection controller obtains the printer identifier as a BLE tag transmitting from or near the specific network printer.

As was discussed above with reference to the FIG. 1, the printer connection controller may also in some situation acquire the printer identifier as a QR or barcode tag that is displayed on a screen of the printer or affixed on a sticker on or near the printer.

According to an embodiment, at 214, the printer connection controller obtains the printer identifier and the print data from an agent service that is processing on a handheld device that is within a configured proximity distance to the specific network printer. One such agent service is the handheld print manager discussed above with reference to the FIG. 1.

At 220, the printer connection controller maps the printer identifier to the specific network printer. There can be many printers within a retail establishment and the network Internet Protocol (IP) addresses or network names may be different from the maintained printer identifiers. The printer connection controller manages a mapping of the printer identifiers to specific IP addresses or network names for specific printers.

At 230, the printer connection controller forwards the print data to the specific network printer for immediate printing. By immediate it is meant that the print data is automatically streamed to the specific network printer for printing (albeit other jobs may be printing at that time so the specific network printer can queue the job).

According to an embodiment, at 240, the printer connection controller processes as a server service on a network server or a POS terminal of a retail establishment.

In another case, at 250, the printer connection controller processes as a print server on a handheld device of a retail establishment. Here, communication between the handheld device and the specific network printer is P2P.

Figure 3:
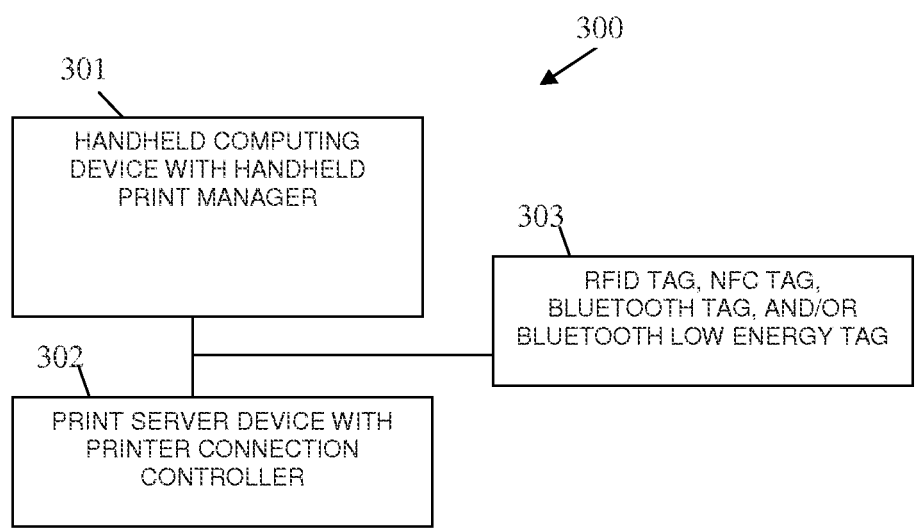
FIG. 3 is a diagram retail printing system, according to an example embodiment.

FIG. 3 is a diagram retail printing system 300, according to an example embodiment. The retail printing system 300 is implemented as executable instructions and programmed within memory of processors or a non-transitory computer-readable (processor-readable) storage medium that executes on one or more processors of one or more computing devices; the processors of the computing devices are specifically configured to execute the retail printing system 300. The retail printing system 300 is operational over a network; the network is wired, wireless, or a combination of wired and wireless.

The retail printing system 300 implements, inter alia, the method 100 and the method 200 of the FIGS. 1 and 2, respectively.

The retail printing system 300 includes a handheld print manager 301 and a printer connection controller 302. In an embodiment, the retail printing system 300 also includes an RFID tag, an NFC tag, a Bluetooth tag, or a BLE tag 303. Each of these and their interaction with one another is now discussed in turn.

The handheld print manager 301 is implemented and resides within memory or non-transitory computer-readable storage medium of a handheld device. Example processing associated with the handheld print manager 301 was discussed above in detail with respect to the FIG. 1.

The handheld print manager 301 is configured to acquire an identifier for a printer within a configured proximity distance to that printer. The handheld print manage 301 is also configured to transmit the identifier and print data opened on the handheld device to the printer connection controller.

The printer connection controller 302 is implemented and resides within memory or non-transitory computer-readable storage media for a print server device. Example processing associated with the printer connection controller 302 was presented in detail above with reference to the FIG. 2.

The printer connection controller 302 is configured to map the identifier to the printer and to send the print data to the printer on behalf of the handheld print manager 301 of the handheld device for printing on the printer.

The print server device can be a network server of a retail establishment, a POS terminal of a retail establishment, or the handheld device itself (as discussed above with reference to the FIG. 2).

According to an embodiment, the retail printing system 300 also includes an RFID tag, a Bluetooth tag, a BLE tag, or an NFC tag 303 that transmits from the printer within a configured proximity or limited geographic range from the printer. It is also noted that QR tags or barcode tags can be used and affixed on or within a display of the printer such that the printer identifier is acquired via a scan from the handheld device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in memory of a non-transitory processor-readable medium and to execute on one or more processors of a handheld device configured to execute the method, comprising:

acquiring, by the handheld device, a unique identifier as a tag physically associated with a printer of a retail establishment, wherein the handheld device is operated by a waiter and the retail establishment is a restaurant and identifying the unique identifier for the printer based on that printer's proximity to a location of the waiter within the restaurant, wherein acquiring further includes wireless obtaining, by the handheld device the unique identifier;

automatically communicating, by the handheld device, the unique identifier and print data opened on the handheld device to a server service that is a print server executing on the handheld device, the server service automatically streaming the print data to the printer and initiating immediate printing by the printer during a Peer-to-Peer (P2P) connection between the print server of the handheld device and the printer, and maintaining, by the print server of the handled device, the unique identifier in a mapping for uniquely identifying the printer by the print server, wherein automatically communicating further includes adding local attractions data as instructed by a customer to the print data before automatically streaming and providing the printer data with the local attractions data as a customer receipt from the restaurant.

2. The method of claim 1, wherein acquiring further includes obtaining the unique identifier as a Radio Frequency Identifier (RFID) tag that is read by an RFID reader integrated into the handheld device.

3. The method of claim 1, wherein acquiring further includes obtaining the unique identifier as a Near Field Communication (NFC) tag that is read by an NFC reader integrated into the handheld device.

4. The method of claim 1, wherein acquiring further includes obtaining the unique identifier as a Bluetooth tag or Bluetooth Low Energy (BLE) tag that is broadcast from or near the printer and read by a Bluetooth or BLE driver integrated into the handheld device.

5. The method of claim 1, wherein acquiring further includes obtaining the unique identifier as an Quick Response (QR) tag or barcode scanned by a camera integrated into the handheld device and scanned from a display of the printer or a sticker affixed on or near the printer.

6. The method of claim 1, wherein communicating further includes transmitting the unique identifier to the server service over a network connection, wherein the server service resides on a network server.

7. The method of claim 1, wherein communicating further includes passing the unique identifier to the server service on the handheld device, wherein the server service resides as a print server service on the handheld device.

8. The method of claim 1, wherein communicating further includes automatically detecting the print data as the customer receipt opened for viewing on the handheld device.

9. The method of claim 1, wherein communicating further includes prompting a user of the handheld device to select the print data when multiple different customer receipts are detected as being open for viewing on the handheld device.

10. The method of claim 1, wherein communicating further includes adding offer data to the print data based on policy evaluation before communicating the print data for printing on the printer.

11. The method of the claim 1, wherein communicating further includes adding offer data to the print data based on instructions received from a user of the handheld device.

12. A processor-implemented method programmed in a non-transitory processor-readable medium and to execute on one or more processors of a device configured to execute the method, comprising:

receiving, at the device, a printer identifier and print data, wherein the device is a handheld device operated by a waiter, identifying the print data as a customer receipt and local attractions data added by the waiter in response to direction of a customer and receiving the printer identifier as a tag that is physically associated with the printer;

establishing, by the device, a Peer-to-Peer (P2P) connection with a printer identified by the print identifier through initial interaction with a print server executing on the device, and maintaining, by the printer server, a mapping between the printer identifier and the printer; and forwarding and automatically streaming, from the device during the P2P connection by the print server, the print data to the printer for printing and delivering over the streaming the print data from the device to the printer.

13. The method of claim 12, wherein receiving further includes obtaining the printer identifier as a Radio Frequency Identifier (RFID) tag affixed on or integrated into the printer or affixed on an object within a configured proximity of the printer.

14. The method of claim 12, wherein receiving further includes obtaining the printer identifier as a Near Field Communication (NFC) tag affixed on or integrated into the printing device or affixed on an object within a configured proximity of the printer.

15. The method of claim 12, wherein receiving further includes obtaining the printer identifier as a Bluetooth Low Energy (BLE) tag transmitted from or near the printing device.

16. The method of claim 12, wherein receiving further includes obtaining the printer identifier and the print data from an agent service processing on a handheld device that is within a configured proximity to the printer.

17. A system, comprising:
a first memory of a handheld device having a handheld print manager that executes on one or more processors of the handheld device; and
a print server executing on the one or more processors of the handheld device;
wherein the handheld print manager is configured to acquire an identifier as a tag that is physically associated with a printer within a configured proximity to the printer and the print server is configured to establish a Peer-to-Peer (P2P) connection between the handheld device and the printer based on the identifier and automatically transmit during the P2P connection print data opened on the handheld device from the handheld device to the printer for printing on behalf of the handheld print manager of the handheld device and wherein the identifier is maintained by the print server as a mapping for uniquely identifying the printer by the print server of the handheld device, and wherein the print server is further configured to add local attractions data as directed by a customer to the print data and provide the print data as a customer receipt for the customer.

18. The system of claim 17, wherein the identifier is one of: a Radio Frequency Identifier (RFID) tag, a Near Field Communication (NFC) tag, and a Bluetooth Low Energy (BLE) tag configured to be transmitted from or within the configured proximity to the printing device and acquired by the handheld print manager of the handheld device.

* * * * *